US006490634B2

(12) United States Patent
Coiner

(10) Patent No.: US 6,490,634 B2
(45) Date of Patent: Dec. 3, 2002

(54) ADAPTIVE DIGITAL DATA TRANSFER APPARATUS AND METHOD

(75) Inventor: Douglas L. Coiner, San Diego, CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/039,076

(22) Filed: Mar. 13, 1998

(65) Prior Publication Data

US 2002/0129171 A1 Sep. 12, 2002

(51) Int. Cl.[7] ................................................. G06F 9/00
(52) U.S. Cl. ........................................................ 709/329
(58) Field of Search ................................ 709/332, 310, 709/200, 203, 329; 345/326, 335; 707/513, 514

(56) References Cited

U.S. PATENT DOCUMENTS

| | | | | | |
|---|---|---|---|---|---|
| 5,596,655 | A | * | 1/1997 | Lopez | 382/173 |
| 5,608,909 | A | * | 3/1997 | Atkinson et al. | 709/315 |
| 5,689,664 | A | * | 11/1997 | Narayanan et al. | 345/340 |
| 5,734,905 | A | * | 3/1998 | Oppenheim | 709/315 |
| 5,897,650 | A | * | 4/1999 | Nakajima et al. | 707/539 |
| 5,911,066 | A | * | 6/1999 | Williams et al. | 395/710 |
| 5,924,099 | A | * | 7/1999 | Guzak et al. | 707/100 |
| 6,212,577 | B1 | * | 4/2001 | Stern et al | 709/329 |

OTHER PUBLICATIONS

Meyer "What is an Object–Oriented Environment?—Five Priciple and their Application" Journal of Oject–Oriented Programming, vol. 6, No. 4, Jul.–Aug. 1993.*

Evans "OLE & Microsoft Object Technology Framework" Object magazine, May 1996.*

* cited by examiner

Primary Examiner—St. John Courtenay, III
Assistant Examiner—Van H. Nguyen

(57) ABSTRACT

An apparatus and method for transferring digital data from a source application in a computer to a destination application in a computer through one of plural types of transfers. The apparatus automatically determines how a transfer can be made by automatically analyzing the receptivity of the destination application to a particular type of transfer. The types of transfers used are clipboard transfers (preferred), drag-and-drop transfers and specific transfer methods specified in a database. The apparatus also automatically makes the type of transfer to which the destination application is receptive. The method establishes the identification of the destination application by determining which application was used last or by having the user designate a destination application. Then the method automatically transfers the digital data through the use of several different types of transfers. Specifically the method uses, clipboard transfers, drag-and-drop transfers, and specific transfer methods specified in a database. Further, these transfer methods are ordered in such a way so as to maximize their efficiency.

29 Claims, 8 Drawing Sheets

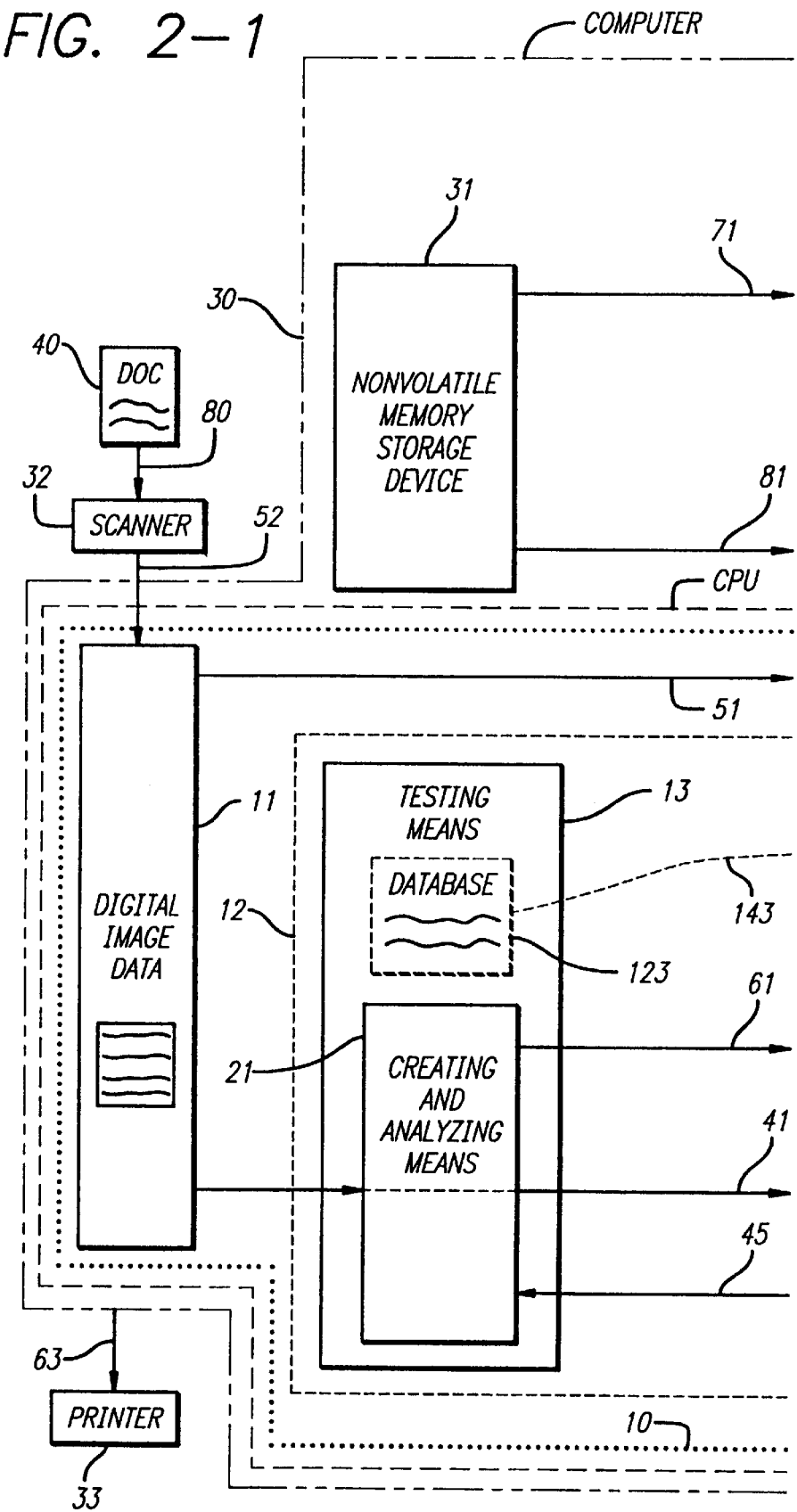

ADAPTIVE DIGITAL DATA TRANSFER APPARATUS AND METHOD

RELATED PATENT DOCUMENTS

Closely related documents are U.S. patent Ser. No. 08/684,736 of Tammer, Hong, and Valencia entitled "Integrated Shell-And-Chassis Construction For a Desktop Image-Related Device"; U.S. patent Ser. No. 08/706,032 of Hong, Zepeda and Kennedy entitled "Image-Related Device Having Image-Medium Receiving Tray, and a Tray For Same, And a Method For Designing Such Tray"; and U.S. patent Ser. No. 08/844,140 of Hong, Harris, Andersen and Johnson entitled "Image-Related Device with Printed-Circuit Assembly Cantilevered From Sheet-Metal Base with Clip Fastenings".

FIELD OF THE INVENTION

This invention relates generally to computer software programs and more specifically to software programs for automatically transferring digital data from one application program to another.

BACKGROUND OF THE INVENTION

A common apparatus used in the computer industry is a scanner. A scanner translates physical data, such as a document or a photograph, into a digital representation of the data for use in the computer. The digital data are placed in an application. This application is usually associated with the scanner so I will call it a scanning application or source application.

An application is generally any distinct program in a computer—for example, a word-processing application, a financial-management application, a drawing application, or in this case a scanning application. Modern computers employ a multitasking environment, which means that a computer can operate several applications simultaneously.

Modern multitasking computer environments are available as various commercial operating systems such as Windows® and Macintosh systems®. In order to facilitate use of the multitasking environment these commercial products use a graphical user interface. The graphical interface allows the user to operate the computer by pointing at commands with a mouse or touch pad and clicking to implement a command.

One common resource in such operating systems, sometimes called a "clipboard" is an area of shared memory for all the applications. Data can be transferred from one application to another through the use of the clipboard. All applications have access to the clipboard, and the clipboard can accept data in commonly used formats from applications.

Use of the term "clipboard" is not meant to limit my invention to the Windows environment. The term is meant to describe broadly an area of storage for objects, data, or their references, in any multitasking environment.

Drag-and-drop transfer is another feature of the graphical interface in a Windows-like system. It allows the user to transfer data from one application to another though the graphical user interface and mouse or touchpad.

Even if the destination application indicates that it supports a drag-and-drop transfer, there is a chance that the destination application cannot use the data "dropped" onto it. The reason for this seeming error is that the destination application does not know what the data are that are being dropped onto it until after the drop is completed.

This is an unavoidable peril in making drag-and-drop transfers, whether they are made manually or automatically. I say unavoidable because, after all, these destination applications have been or will be designed by others and each application has a different format.

The Microsoft Corporation publishes a book titled *Windows Interface Guidelines for Software Design*. This book can be consulted for basic design principles in creating any application for the Windows environment. It can also be consulted for further understanding of certain concepts embodied in my invention.

RELATED ART

Many users want to transfer the digital data from the scanning application to a different application to edit the data or to use the data in a project. Currently there are two different methods available for transferring the digital data, a manual transfer or a single-method transfer program.

(a) Manual transfer—The user might be able to manually transfer digital data by performing all the steps in one of the following procedures:

1. Save the data to a file, start the destination application and then open the file in the destination application.
2. Copy the data from a source application to the system clipboard, start the destination application and paste the data from the clipboard to the destination application.
3. Using the now familiar graphic user interface and mouse or touchpad, drag the data icon from the source application and drop the data icon onto the destination application.

Although the user may attempt to transfer digital data through one of the above procedures, the destination application may not support that particular type of transfer. Therefore, even after one of the manual transfer procedures has been painstakingly followed, the transfer may fail.

If it fails, the user is left attempting the transfer by one of the other two manual procedures, which also may fail. Therefore, the user may have applied all three manual methods before successfully completing a transfer.

(b) Transfer programs—In response to the cumbersome nature of the manual transfer procedures, several types of software programs have been produced. These programs use different types of transfer methods: a single-method transfer, a preselected domain of supported applications, or a combination of the two.

A single-method transfer program automates one of the three manual procedures described above. This program reduces the amount of work required to transfer digital data as long as the destination application supports the particular type of transfer that the program employs.

If the single-method transfer program fails, the user must then resort to manually transferring the data. Thus, the problems associated with manual transfer discussed above are still present in this type of program.

A preselected domain of supported applications is a transfer program which contains a database of enumerated applications for which the program can complete a transfer. The database also specifies a transfer method for each of the enumerated applications.

When the user attempts a data transfer to a destination application, unless the destination application is one enumerated in the programs database, it cannot be completed. Therefore, the user is again left to attempt a manual transfer of the data.

Due to the shortcomings of the above transfer programs others have combined the two transfer methods discussed above to increase the probability that the data transfer will be successful. The problem is, however, that the user is still too often left to attempt a manual transfer.

(c) Conclusion—The methods discussed above fail to achieve quick and easy digital data transfer. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is an apparatus for transferring digital data from a source application in a computer to a destination application in a computer through one of plural types of transfers. The transfer is not limited to applications in one computer—the transfer may occur from a source application in one computer to a destination application in another computer. The word computer is to be interpreted in a broad sense to encompass any mode or means that may be developed for holding a procedure or application.

The apparatus includes some means for automatically determining how a digital data transfer can be made. For purposes of breadth and generality in describing and discussing my invention, I shall call these means the "determining means". The determining means operate by analyzing whether the destination application is receptive to a particular type of transfer.

The apparatus further includes some means for automatically making a type of transfer to which the analyzing shows the destination application is receptive. Again for generality and breadth in discussing my invention, I shall refer to these means simply as the "transfer-making means". The transfer-making means operate in response to the output of the determining means.

The foregoing may constitute a description or definition of the first facet of the invention in its broadest or most general form. Even in this general form, however, it can be seen that this aspect of the invention significantly mitigates the difficulties left unresolved in the art.

In particular, this aspect or facet of the invention creates a very effective apparatus for automatically transferring digital data from one application to another. The apparatus is effective because it uses several different types of transfers. It does not, however, just blindly attempt these transfers to the destination application.

The apparatus, instead, analyzes the destination application to determine whether it is receptive to a particular type of transfer. This testing of the receptivity of the destination application to a clipboard transfer is dynamic.

It does not merely encompass looking at a list of destination applications for which particular transfers are supported. It actually determines whether the destination application supports a particular type of transfer. Therefore, my invention is adaptable to the destination application.

This feature allows the apparatus to transfer digital data to destination applications that will be created in the future, as well as those already existing but unknown to writers of particular scanning programs. Thus, the apparatus is not limited to transferring digital data to existing and known destination applications.

The use of plural types of transfers is also important because not all destination applications accept the same type of transfer. Therefore, this apparatus increases the probability that a transfer will be successful. Further, once the apparatus determines which transfer method is appropriate for the destination application, it automatically implements that transfer.

Thus, a once tedious manual process is almost completely automated by my invention. As previously discussed, the manual process can be frustrating and time consuming, whereas with my invention the transfer can be done essentially with the push of a button.

Although this aspect of the invention in its broad form thus represents a significant advance in the art, it is preferably practiced in conjunction with certain other features or characteristics that further enhance enjoyment of overall benefits.

For example, it is preferred that the apparatus further include a nonvolatile memory storage device holding operating instructions for the determining means and the transfer-making means. It is also preferred that the determining means include some means for automatically learning how a digital image transfer can be made.

It is further preferred that the determining means include some means for testing whether the destination application is receptive to a clipboard transfer. For generality in discussing my invention, I will refer to these means as the "testing means". The testing means include some means for creating a clipboard entry of the data and analyzing the menu of the destination application to ascertain whether the destination application supports clipboard transfer.

It is preferred that the determining means further include some means for evaluating whether the destination application is receptive to a drag-and-drop transfer. Again for generality and breath in discussing my invention, I shall call these means simply the "evaluating means".

It is also preferred that the evaluating means operate after the testing means. Preferably the evaluating means include some means for analyzing the status flags of the destination application to assess whether the destination application supports a drag-and-drop transfer.

Another preference is that the source application, previously mentioned, include the determining means, the transfer-making means, the testing means, and the evaluating means. Preferably the apparatus further includes some means for making the destination application an active application after the transfer-making means complete said type of transfer to which the destination application is receptive.

In preferred embodiments of a second independent facet or aspect, the invention is an apparatus for transferring digital data from a source application in a computer to a destination application in a computer. The transfer is made through the use of the system clipboard. The apparatus includes some means for automatically testing whether the destination application is receptive to a clipboard transfer.

The apparatus also includes some means, which are responsive to the testing means, for automatically implementing a clipboard transfer. Again for generality I will refer to these means as the "implementing means".

The foregoing may constitute a description or definition of the second facet of the invention in its broadest or most general form. Even in this general form, however, it can be seen that this aspect of the invention too significantly mitigate the difficulties left unresolved in the art.

In particular, this apparatus uses a clipboard transfer. This type of transfer is very effective because, as discussed earlier, the clipboard is an area of shared memory for all the applications. Further, virtually all applications support at least one of the data formats on the clipboard. Therefore, the chances that the clipboard transfer will be successful are very high.

This apparatus also automatically tests whether the destination application supports a clipboard transfer. If a clipboard transfer is supported the apparatus automatically implements the transfer.

Although this second aspect of the invention in its broad form thus represents a significant advance in the art, it is preferably practiced in conjunction with certain other features or characteristics that further enhance enjoyment of overall benefits.

For example, it is preferred that the apparatus further include a nonvolatile memory storage device holding operating instructions for the testing means and the implementing means. It is also preferred that the testing means include some means for creating a clipboard entry of the data and analyzing the menus of the destination application to determine whether the paste function has been enabled.

Although I am calling it a paste function, I mean it in a broad sense to incorporate its general meaning of copying the clipboard entry to a specified destination. I do not intend to limit this invention to the Windows environment. I will more completely explain this issue in the detailed description of the preferred embodiments.

Also preferred is that the apparatus further include some means for evaluating whether the destination application is receptive to a drag-and-drop transfer. I shall refer to these means simply as the "evaluating means". The evaluating means only operate if the testing means discover that the destination application is not receptive to a clipboard transfer.

The apparatus also includes some means, which are responsive to the evaluating means, for automatically implementing a drag-and-drop transfer. When the preference just described is observed it is desirable that the evaluating means include some means for examining the status flags in the destination application.

Another preference is that the testing means further include a database that specifies a transfer method for plural destination applications respectively. This is particularly useful in case the digital data cannot be transferred through a clipboard transfer or a drag-and-drop transfer. The preference also includes some means for automatically assessing whether the destination application is in the database. In this situation it is also preferred that the apparatus include some means for automatically implementing the transfer method specified in the database.

Although the database is known in the prior art it has particular value as an addition to the present invention. It allows the invention to encompass destination applications which do not support clipboard transfers or drag-and-drop transfers.

In preferred embodiments of a third of its independent aspects or facets, the invention is an apparatus for transferring digital data from a source application in a computer to a destination application in a computer through the use of a drag-and-drop transfer. The apparatus includes some means for automatically evaluating whether the destination application is receptive to drag-and-drop transfer, and means for automatically implementing drag-and-drop transfer. The implementing means operate in response to the output of the evaluating means.

The foregoing may constitute a description or definition of the third facet of the invention in its broadest or most general form. Even in this general form, however, it can be seen that this aspect of the invention too significantly mitigate the difficulties left unresolved in the art.

In particular, automated selection and performance of drag-and-drop transfer is especially useful since most application developers have invested great effort in designing and debugging their systems for this type of transfer. The underlying reason for this attention is that the drag-and-drop method is a particularly favored form of transfer among the great number of graphical-interface users who are uncomfortable with computer command syntax and even the relative abstraction of the clipboard.

Although this third aspect of the invention in its broad form thus represents a significant advance in the art, it is preferably practiced in conjunction with certain other features or characteristics that further enhance enjoyment of overall benefits.

For example, it is preferred that the apparatus further include a nonvolatile memory storage device holding operating instructions for the evaluating means and the implementing means. It is also preferred that the evaluating means include some means for examining the status flags in the destination application.

It is preferred that the evaluating means further include some means for automatically testing whether the destination application is responsive to a clipboard transfer. These means operate only if the evaluating means discover that the destination application is not receptive to a drag-and-drop transfer.

The apparatus also includes some means, which are responsive to the testing means, for automatically implementing a clipboard transfer. When the preference described above is observed, it is desirable that the testing means include some means for creating a clipboard entry of the data and analyzing the menus of the destination application to determine whether the paste function has been enabled. The database preference mentioned above is also desirable as a preference in this embodiment.

In preferred embodiments of a fourth of its aspects, the invention is a digital data transfer method which transfers data from a source application in a computer to a destination application in a computer. The method includes several steps.

The first step is establishing identification of a destination application. The second step is automatically ascertaining whether the destination application is running, and if it is not, then automatically starting the destination application.

The third step is automatically assessing whether the destination application has a transfer method specified in a database, and if it is specified, then automatically transferring the image to the destination application according to the method specified. If no transfer method is specified, then the next step is automatically setting up a clipboard transfer of the data.

The next step is automatically testing whether the destination application supports clipboard transfer, and if it is supported, then automatically applying the results of the testing step to implement the transfer. If clipboard transfer is not supported, then the method includes automatically evaluating whether the destination application supports drag-and-drop transfer. If drag-and-drop transfer is supported, then the next step is automatically applying the results of the evaluating step to implement the transfer.

The foregoing may constitute a description or definition of the fourth facet of the invention in its broadest or most general form. Even in this general form, however, it can be seen that this aspect of the invention too significantly mitigate the difficulties left unresolved in the art.

In particular, this method completely automates a process which was mainly a manual process. This method is also organized in such a way that the most effective type of transfer is tested first. The method first assesses whether the destination application has a specified transfer method in a database.

This step is done first because if the transfer method is specified in the database, then a transfer can immediately be made according to the method specified. No analyzing of the destination application is necessary. Therefore, it saves time and reduces uncertainty to first ascertain whether the destination application is enumerated in the database.

If the destination application is not enumerated in the database, the method then tests whether the destination application supports clipboard transfer. It is important that a clipboard transfer be tested before a drag-and-drop transfer. The probability that a destination application supports clipboard transfer, as opposed to drag-and-drop transfer, is greater. Thus, testing whether a clipboard transfer is supported first increases the efficiency of the method.

Also, clipboard transfers are more effective because the clipboard is a universal resource, in a sense, for a Windows-like multitasking system. The data in the clipboard is accessible to all the applications and is in a format which almost all applications are able to use. Further, my invention actually detects whether the destination application supports the data format of the clipboard entry.

Therefore, if the destination application indicates that it is receptive to a clipboard transfer, it can actually use the transferred data. In comparison, the destination application may indicate that it supports drag-and-drop transfer, but there is a chance that the destination application cannot use the data dropped onto it as discussed previously. This is another reason that it is important to test the clipboard transfer first.

The drag-and-drop method is included in this method, however, because some applications do not support clipboard transfer, but they do support drag-and-drop transfer. Therefore, by including drag-and-drop transfer I increase the overall effectiveness of the method.

Although this fourth aspect of the invention in its broad form thus represents a significant advance in the art, it is preferably practiced in conjunction with certain other features or characteristics that further enhance enjoyment of overall benefits.

For example, it is preferred that the establishing step include receiving identification of the destination application from a user. It is also preferred that the testing step include looking for a menu in the destination application, and if no menu is found, then automatically evaluating whether the destination application supports drag-and-drop transfer.

If the preference just described is observed, then it is also preferred that the method automatically attempt clipboard transfer to the destination application if drag-and-drop transfer is not supported. This clipboard transfer is slightly different from the clipboard transfer discussed earlier, although they both are clipboard transfers. The clipboard transfer mentioned earlier tests the destination application to determine whether it has a menu. If no menu is found, then the method moves directly to the drag-and-drop evaluating step.

On the other hand, this clipboard transfer does not require the destination application to have a menu—the method just attempts to make a clipboard transfer. The method attempts a transfer directly through the use of keyboard codes without testing a graphic menu. It is preferred that if this clipboard transfer is not supported, then the system automatically refrains from making any transfer.

It is also preferred that the method further include displaying a list of running applications and displaying a list of applications previously used by the user as a selection of possible destination applications for the user. It is also preferred that the method further include receiving from the user a "browse" instruction, and in response, displaying a listing of all possible destination applications for the user.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

Figures 1, 1A, 1B:
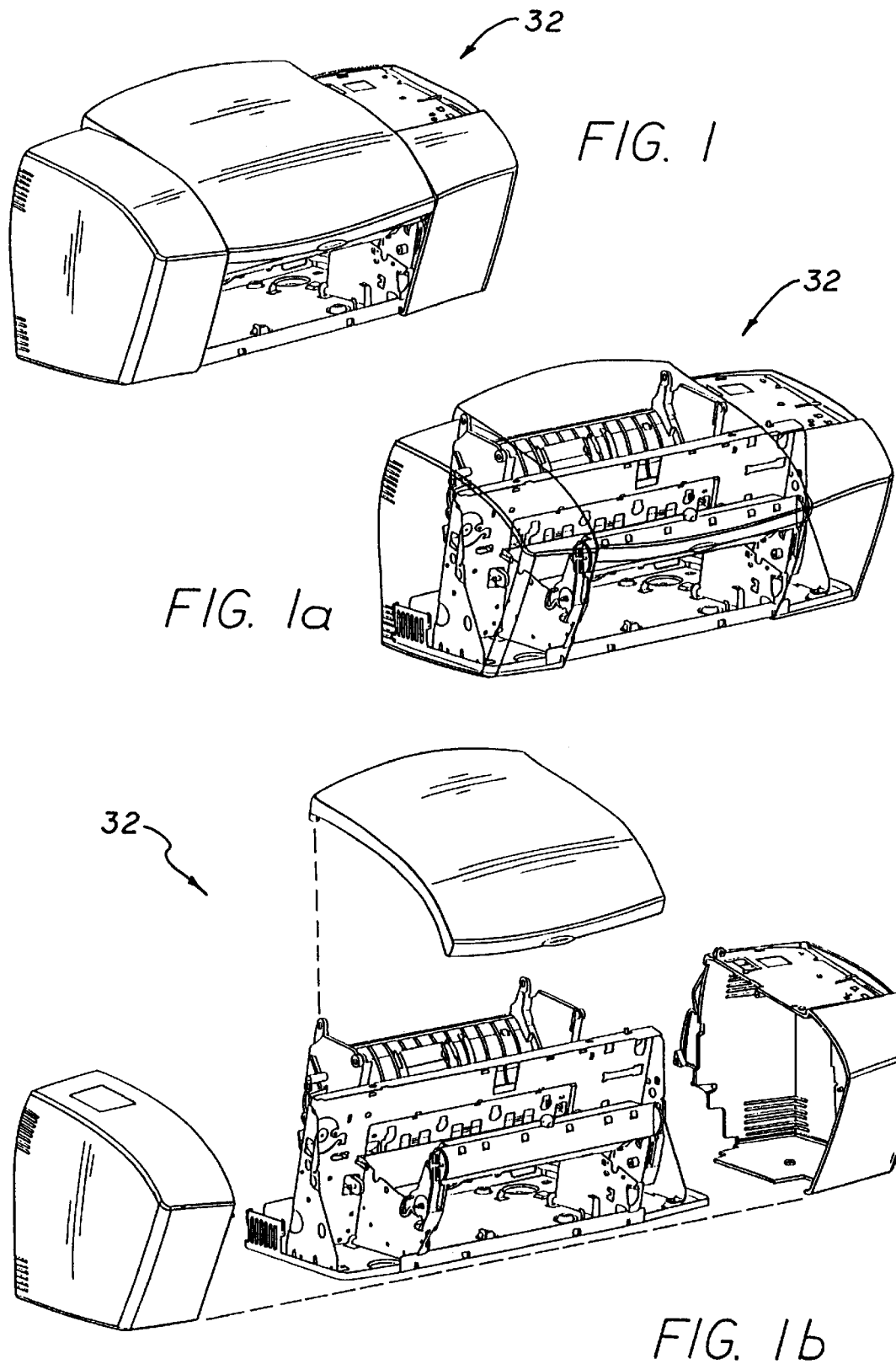
FIG. 1 is an isometric view, taken from above and to the left, of the exterior of a scanner (without control panel or paper trays in place)
FIG. 1a is a like view of the same scanner but with the side covers and top dust cover treated as if transparent, to show the covers in their relationships to all the main internal chassis elements within.
FIG. 1b is a like view of the scanner but exploded to show the internal chassis elements separately from the covers.
Figure 2:
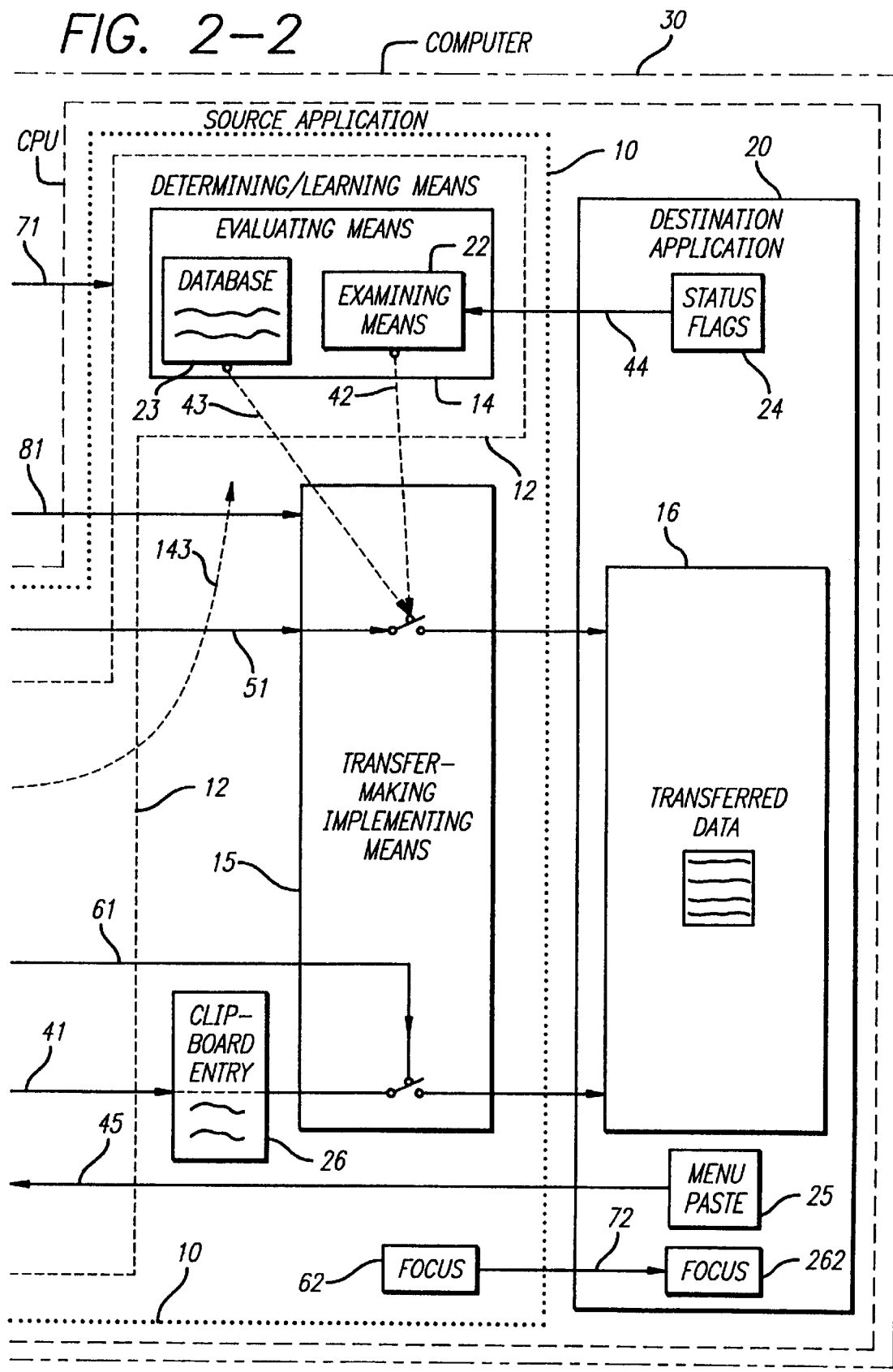
FIG. 2 is a block diagram showing the preferred embodiment of the invention.

In preferred embodiments of the present invention a scanner 32 (FIGS. 1 through 2) is used to scan a document 40 (FIG. 2) into 52 a source application 10 in the form of digital image data 11 within a computer 30. Several types of transfers can be used to transfer the digital image data from the source application 10 to the destination application 20 (FIG. 2). The destination application does not have to be in the same computer as the source application, the digital image data can be transferred to a destination application in another computer (not shown).

The apparatus determines 12 whether various transfer methods can be performed. The apparatus first consults a database 23 (or alternatively database 123) to assess (not shown) whether the destination application 20 is enumerated in the database. The database includes a specific transfer method for each of the enumerated destination applications.

If the destination application is listed in the database 23, then the database directs 43 the transfer 51 of the digital image data 11 to be implemented 15. The digital image data are transferred according to the transfer method specified in the database, and the digital image data become transferred data 16 in the destination application 20.

Second, the apparatus tests 13 whether the destination application supports a clipboard transfer (FIG. 2). the digital image data 11 are used 41 to create 21 a clipboard entry 26 of the data. Then, the apparatus analyzes 45 the menu 25 of the destination application 20 to determine whether the paste function has been enabled.

If the paste function has been enabled the transfer 41 of the clipboard entry 26 is implemented 15. Once the transfer is implemented, the clipboard entry flows 41 to the destination application 20 and becomes transferred data 16.

In the standard Windows environment "paste" is represented by a Control-V key combination, which is what this apparatus analyzes to determine if the destination application supports clipboard transfer. If this configuration were limited to programs written in the English language then the use of the word "paste" itself would probably suffice to cover almost all destination applications. This configuration, however, is not limited to programs written in English. Therefore, the Control-V key combination is analyzed instead because it is generally the standard code for implementing the paste function.

Third, the apparatus evaluates 14 whether the destination application 20 supports drag-and-drop transfer (FIG. 2). To evaluate whether a drag-and-drop transfer is supported, the apparatus examines 22 the status flags 24 of the destination application.

If the status flags indicate 44 that the destination application supports drag-and-drop transfer, a drag-and-drop transfer is implemented 15. Once the transfer is implemented the digital image data 11 flow 51 into the destination application 20 and becomes transferred data 16.

Once the digital image data become transferred data, the apparatus repositions 72 the so-called "Focus" (shown 62 in the source application) into the destination application (see the Focus 262). Thus the destination application is made the active application. This enables the user to immediately begin working in the application to which the digital image data 11 were transferred.

The Focus is typically visible in an application as a dashed box outlining a control button or other control. When the Focus is moved out of the source application and into the destination application, it makes the destination application the active application.

The apparatus relies on the destination application to position the Focus within the window of that destination application. The placing of the Focus 262 into the destination application 20 makes the destination application the active application.

Within the computer 30 is a nonvolatile memory storage device 31 for holding operating instructions for the determining means 12 and the transfer-making means 15. The preferred embodiment incorporates a printer 33 (FIG. 2). The printer can receive 63 a document or image from the computer and print it.

Figure 3:
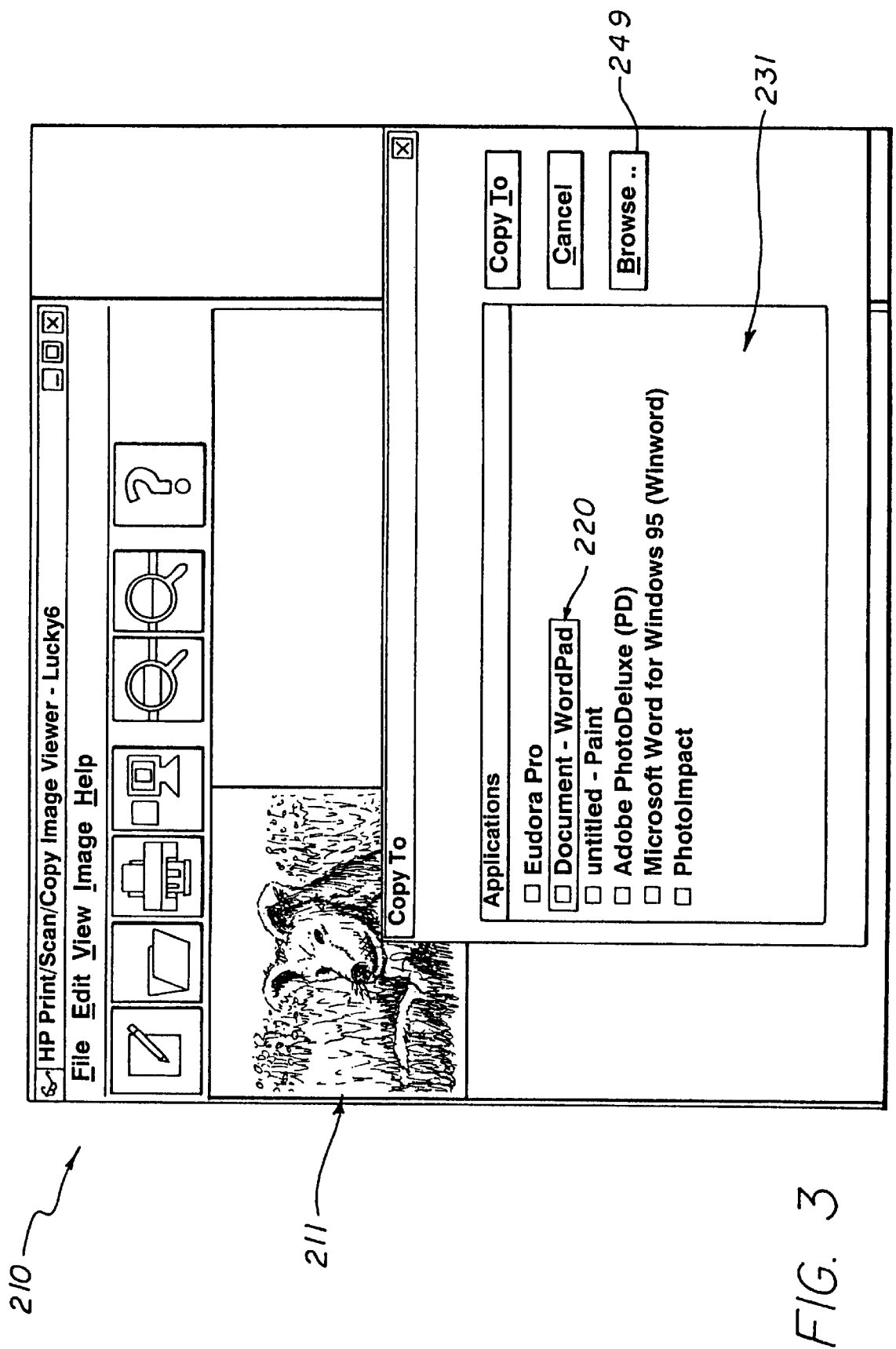
FIG. 3 is a picture showing an image scanned into an application using a "Copy To" application window which shows several example destination applications, and Word-Pad® highlighted as the destination application.

The preferred embodiment also incorporates the scanner 32. A document 40 is placed 80 into the scanner 32, which then scans 52 the document, creating corresponding digital image data 211 file within the source application 210 (FIG. 3) in the computer 30.

The preferred embodiment further includes a copier. Combining the printer capability with the scanning capability creates the copier. Alternatively, the digital image data can be transferred to a destination application 220.

The user can select a destination application from a list of running or previously used applications 231. The user can also select the browse button 249 to get a list of all possible destination applications.

Figure 4:
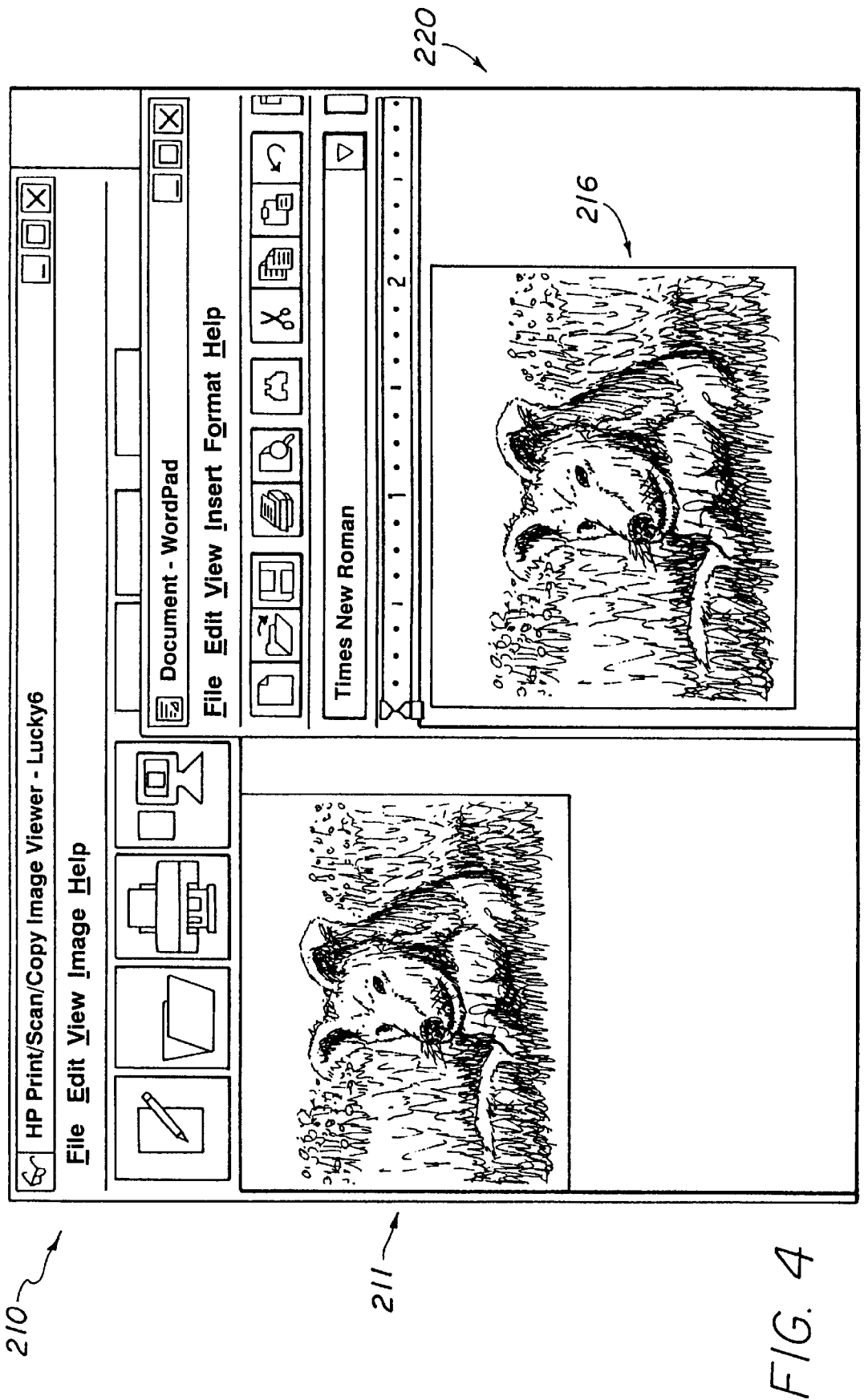
FIG. 4 is a like picture showing the image transferred to WordPad.

The application selected is the highlighted application Document-WordPad 220. The digital image 211 can then be transferred to the destination application 220 as a digital image 216 (FIG. 4).

I am using the word transfer, but the digital image data are not being removed from the source application. The digital image data are copied and transferred to the destination application. The digital image data 211, therefore, remain in the source application 210 as well as being transferred to the destination application 220.

Figure 5:
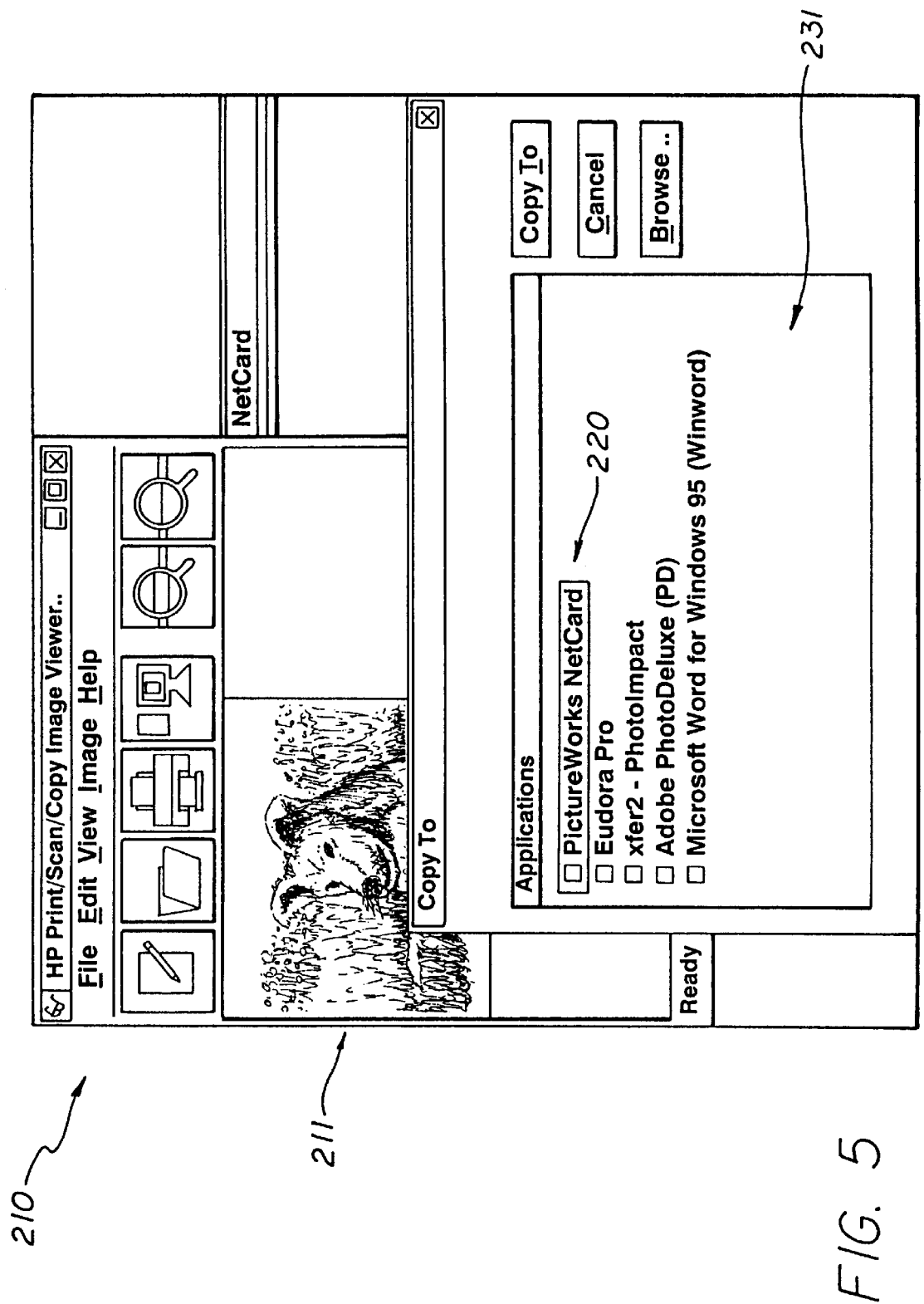
FIG. 5 is a like picture showing PictureWorks® Net-Card® highlighted as the destination application.
Figure 6:
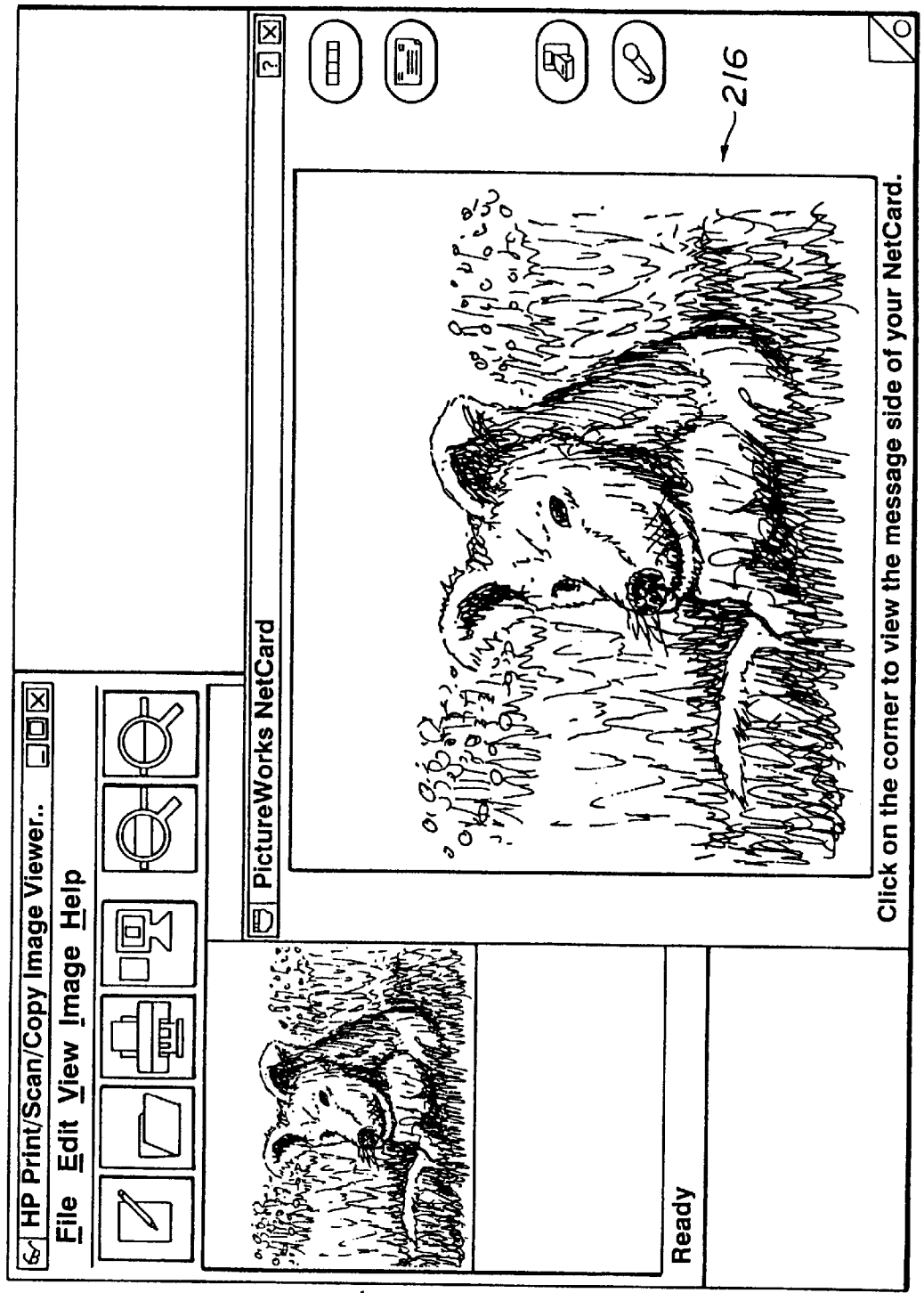
FIG. 6 is a like picture showing the image transferred to PictureWorks NetCard.

The application selected is the highlighted application PictureWorks NetCard 220 (FIG. 5). Once the destination application is selected the image can be transferred to it 216 (FIG. 6).

Another preferred embodiment is the method for transferring digital data from a source application to a destination application. The method is comprised of several steps.

Figure 7:
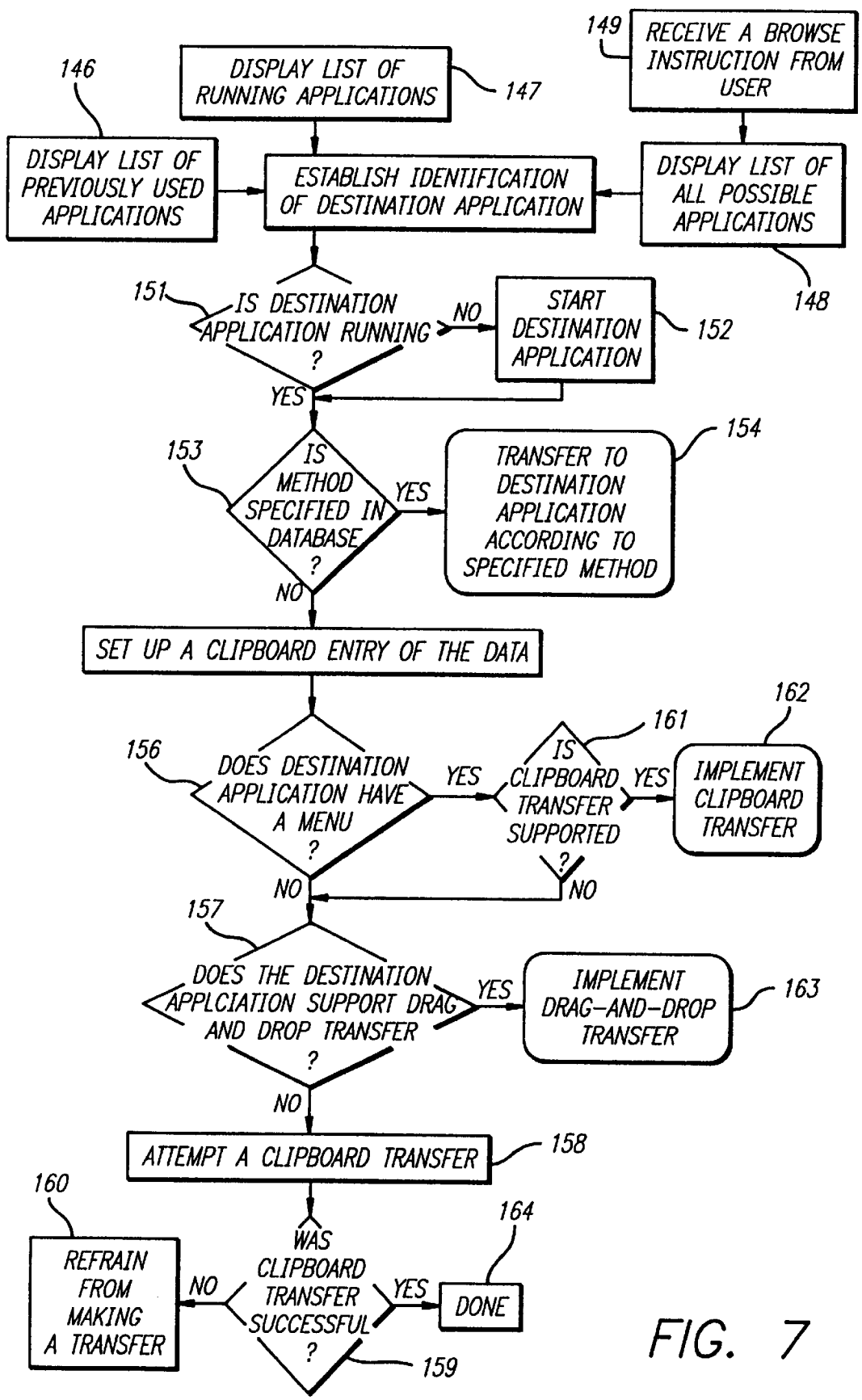
FIG. 7 is a flow chart showing the steps of the method.

The first step is to establish the identification of the destination application 150 (FIG. 7). The user establishes the identification of the destination application by having selecting the application to which the data will be transferred.

The method provides a selection of destination applications for the user, including: displaying a list of previously used applications for the user 146, displaying a list of running applications 147, or receiving a browse instruction from the user 149. If a browse instruction is received, then the system displays all possible applications 148.

When the method displays a list of running applications 147, the applications may be sorted in a particular order. The order of the list can reflect the order of the layering of the application windows on the graphical interface.

The next step is to determine whether the destination application is running 151 (FIG. 7). If the destination application is not running, then the system starts the destination application 152.

If the destination application is running, then the system determines whether the transfer method is specified in a database 153. If the transfer method is specified in the database, then the system transfers the digital data to the destination application according to the specified method 154. If the transfer method is not specified in the database, then the system sets up a clipboard entry of the data 155.

The next step is to determine whether the destination application has a menu 156. If the destination application has a menu, then the system determines whether the destination application supports clipboard transfer 161. If clipboard transfer is supported, then the system implements the clipboard transfer 162.

If the destination application has no menu, or if clipboard transfer is not supported, then the next step is to determine whether the destination application supports drag-and-drop transfer 157. If drag-and-drop transfer is supported, then the system implements the drag-and-drop transfer 163.

If drag-and-drop transfer is not supported, then the system attempts a clipboard transfer 158 (FIG. 7). This attempt is directly through the use of keyboard codes without testing the menu first.

The next step is to determine whether the clipboard transfer was successful 159. If it was successful, then the transfer method is done 164. If it was not successful, then the system refrains from making a transfer 160.

The above disclosure is intended as merely exemplary, and not to limit the scope of the invention—which is to be determined by reference to the appended claims.

What is claimed is:

1. Apparatus for transferring digital data from a source application, in a computer that supports plural types of transfers including clipboard transfers and drag-and-drop transfers, to a destination application in a computer, through an automatically selected one of said plural types of transfers; said apparatus comprising:
   means for automatically determining how a digital data transfer can be made by analyzing whether the destination application is receptive to a particular type of transfer;
   wherein the determining means comprise means for analyzing said plural types of transfers in succession if the destination application fails to be receptive to a first-analyzed type of transfer; and
   means, responsive to the determining means, for automatically making a type of transfer to which said analyzing shows the destination application is receptive.

2. The apparatus of claim 1, further comprising:
   a nonvolatile memory storage device holding operating instructions for the determining means and the transfer-making means.

3. The apparatus of claim 1, wherein:
   the determining means comprise means for automatically learning how a digital image transfer can be made.

4. The apparatus of claim 1, wherein:
   the determining means comprise means for testing whether the destination application is receptive to a clipboard transfer.

5. The apparatus of claim 4, wherein:
   the testing means comprise means for creating a clipboard entry of the data and analyzing menu of the destination application to ascertain whether the destination application supports clipboard transfer.

6. The apparatus of claim 4, wherein:
   the determining means further comprise means for evaluating whether the destination application is receptive to a drag-and-drop transfer.

7. The apparatus of claim 4, wherein:
   the determining means further comprise means for, after operation of said testing means, evaluating whether the destination application is receptive to a drag-and-drop transfer.

8. The apparatus of claim 6, wherein:
   the evaluating means comprise means for analyzing status flags of the destination application to assess whether the destination application supports drag-and-drop transfer.

9. The apparatus of claim 6, wherein:
   said source application comprises the determining means, the transfer-making means, the testing means, and the evaluating means.

10. The apparatus of claim 1, further comprising:
    means for making the destination application an active application after the transfer-making means complete said type of transfer to which the destination application is receptive.

11. Apparatus for transferring digital data from a source application in a computer to a destination application in a computer through the use of a clipboard transfer; said apparatus comprising:
    means for automatically testing whether the destination application is receptive to a clipboard transfer; and
    means, responsive to the testing means, for automatically, if the destination application is receptive to a clipboard transfer, implementing a clipboard transfer, and
    means, responsive to the testing means, for automatically, if the destination application is not receptive to a clipboard transfer r trying a different type of transfer.

12. The apparatus of claim 11, further comprising:
    a nonvolatile memory storage device holding operating instructions for the testing means and the implementing means.

13. The apparatus of claim 11, wherein:
    the testing means comprise means for creating a clipboard entry of the data and analyzing menus of the destination application to determine whether a paste function has been enabled.

14. The apparatus of claim 11, wherein the trying means comprise:
    means for evaluating whether the destination application is receptive to a drag-and-drop transfer; and
    means, responsive to the evaluating means, for automatically implementing a drag-and-drop transfer.

15. The apparatus of claim 14, wherein:
    the evaluating means comprise means for examining status flags in the destination application.

16. The apparatus of claim 14:
    wherein the testing means further comprise:
    a database that specifies a transfer method for plural destination applications respectively, and
    means for automatically assessing whether the destination application is in the database; and
    further comprising means, responsive to the assessing means, for automatically implementing the transfer method specified in the database to transfer the data to the destination application.

17. Apparatus for transferring digital data from a source application in a computer to a destination application in a computer; said apparatus comprising:
    means for automatically evaluating whether the destination application is receptive to drag-and-drop transfer;
    means, responsive to the evaluating means, for automatically implementing drag-and-drop transfer; wherein:
    the evaluating means further comprise means for, if the evaluating means discover that the destination application is not receptive to a drag-and-drop transfer, then automatically testing whether the destination application is responsive to a clipboard transfer; and
    means, responsive to the testing means, for automatically implementing a clipboard transfer.

18. The apparatus of claim 17, further comprising:
    a nonvolatile memory storage device holding operating instructions for the evaluating means and the implementing means.

19. The apparatus of claim 17, wherein:
    the evaluating means comprise means for examining the status flags in the destination application.

20. The apparatus of claim 17, wherein:
    the testing means comprise means for creating a clipboard entry of the data and analyzing menus of the destination application to determine whether a paste function has been enabled.

21. The apparatus of claim 17:
    wherein the evaluating means further comprise:
    a database that specifies a transfer method for plural destination applications respectively, and
    means for automatically assessing whether the destination application is in the database; and further comprising means, responsive to the assessing means, for automatically implementing the transfer method specified in the database to transfer the data to the destination application.

22. A digital data transfer method which transfers data from a source application in a computer to a destination application in a computer; said method comprising the steps of:

establishing identification of a destination application;

automatically ascertaining whether the destination application is running, and if not, then automatically starting the destination application;

automatically assessing whether the destination application has a transfer method specified in a database, and if it is specified, then automatically transferring the data to the destination application according to the method specified in the database;

if no transfer method is specified, then automatically setting up a clipboard transfer of the data;

automatically testing whether the destination application supports clipboard transfer, and if clipboard transfer is supported, then automatically applying the results of the testing step to implement clipboard transfer; and if clipboard transfer is not supported, then automatically evaluating whether the destination application supports drag-and-drop transfer, and if drag-and-drop transfer is supported, then automatically applying the results of the evaluating step to implement drag-and-drop transfer.

23. The method of claim 22, wherein:

the establishing step comprises receiving identification of the destination application from a user.

24. The method of claim 22, wherein the testing step comprises:

looking for a menu in the destination application; and if no menu is found, then automatically evaluating whether the destination application supports drag-and-drop transfer.

25. The method of claim 24, wherein:

if drag-and-drop transfer is not supported, then automatically attempting clipboard transfer to the destination application.

26. The method of claim 25, wherein:

if clipboard transfer is not supported, then automatically refraining from making any transfer.

27. The method of claim 23, further comprising:

displaying a list of running applications as a selection of possible destination applications for the user.

28. The method of claim 23, further comprising:

displaying a list of applications previously used by the user as a selection of possible destination applications for the user.

29. The method of claim 22, further comprising:

receiving from the user a "browse" instruction and in response displaying a listing of all possible destination applications for the user.

* * * * *